May 21, 1968   C. F. WOLFENDALE   3,384,883
CAPACITIVE POTENTIOMETER REBALANCING SYSTEM
Original Filed Sept. 26, 1961
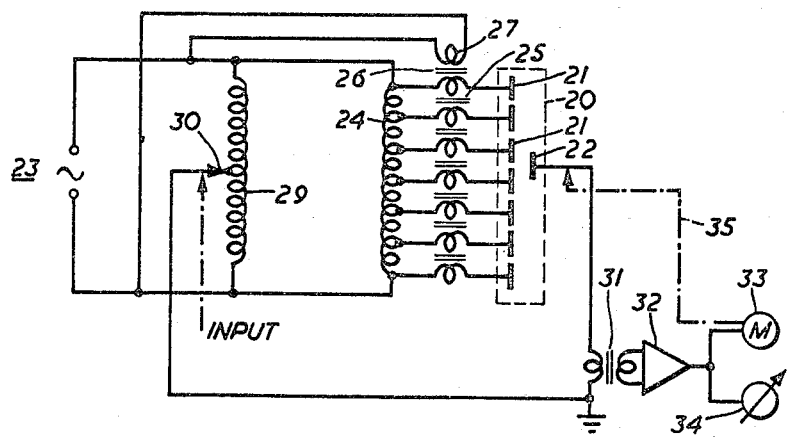
INVENTOR
CALEB FREDERICK WOLFENDALE
BY
Hane and Nydick
ATTORNEYS 3,384,883
CAPACITIVE POTENTIOMETER REBALANCING
SYSTEM
Caleb Frederick Wolfendale, Great Brickhill, near
Bletchley, England, assignor to Sogenique (Electronics) Limited
Continuation of application Ser. No. 140,874, Sept. 26, 1961, now Patent No. 3,287,716, dated Nov. 22, 1966. This application June 2, 1966, Ser. No. 554,705
Claims priority, application Great Britain, Sept. 27, 1960, 33,144/60
3 Claims. (Cl. 340—187)

ABSTRACT OF THE DISCLOSURE

The application discloses an automatically balancing bridge including a capacitive potentiometer comprising a line of discrete stator electrodes coupled electrostatically to a movable pick-off electrode, a manually settable reference potential divider, a servo responsive to the potential difference between the reference divider tap and the pick-off electrode, and a correction transformer having secondary windings connected in the leads to the stator electrodes to inject small potentials for correcting the electrostatic field distribution.

---

This invention relates to electric position-determining and position-control aparatus. More specifically, the invention relates to such apparatus employing a position-sensitive means comprising two relatively movable members, one of which is part of a capacitative potentiometer, and the other a cooperating electrode. An apparatus of this kind is described in my U.S. application No. 844,605 filed Sept. 29, 1959 (now Patent No. 3,071,758). The present application is a continuing application of my U. S. application Ser. No. 140,874, which was filed Sept. 26, 1961, now Patent No. 3,287,716, and which was copending with my application No. 844,605.

One form of apparatus described in Patent No. 3,071,758 comprises a capacitative potentiometer consisting of a line of discrete conductive elements, and a pick-up electrode; the pick-up electrode is insulated from the elements, but is capacitatively coupled thereto. Tapping points on an autotransformer are connected to respective ones of the elements in the line. Means are provided whereby relative movement can occur between the pick-up electrode and the line of elements, and as this relative movement occurs, the pick-up electrode assumes a potential the value of which is related to the potentials on the adjacent elements. The present invention concerns improvements in apparatus of this general kind.

The invention relates broadly to the provision of an auxiliary transformer which is arranged to inject potentials into the leads between the autotransformer and the elements of the line, to correct for minor inaccuracies, for instance in the positioning of the taps on the autotransformer or in the size or positioning of the elements in the line.

Other features and advantages of the invention will appear from the following description of embodiments thereof, given by way of example, in conjunction with the accompanying drawing, the single figure of which is a simplified circuit diagram of apparatus in accordance with the invention.

The form of the invention as shown in the single figure of the drawing is an apparatus which can be used to move an element to a predetermined position. A capacitative potentiometer, the parts of which are enclosed within the dotted rectangular 20, comprises a series of conductive elements 21 and a relatively movable element 22; in the present case the elements 21 are stationary, the electrode 22 being movable. Electrical potentials which are applied to the elements are derived from an alternating current source 23, across which is connected a first inductive device 24. The device 24 has on it a number of taps connected respectively to the elements 21, these connections each including one of the secondary windings 25 of a transformer 26, whose primary winding 27 is fed also from source 23.

As a result of this arrangement, relative potentials on the elements 21 will be determined by the vector sum of the voltages at the taps on device 24 and the voltages appearing on the individual secondary windings 25. By appropriate selection of the taps and the magnitude of the voltages on the secondary windings, the nature of the potential gradient along the length of the series of elements 21 can be selected or adjusted to follow a wide range of characteristics. Thus, the gradient can be made to follow more closely a linear, or non-linear, law and correction can be made for imperfections of the potentiometer 20 or the positioning of the taps on device 24.

In the manner described above, as the movable electrode 22 moves along the elements 21 it will assume a potential, with respect to a reference point, which represents its position relative to the elements of the potentiometer.

It can be arranged that the reference point is so chosen that when the electrode 22 attains a particular position with respect to elements 21 the potential of the electrode 22 bears a predetermined relation to that of the reference point; hence, the positioning of the movable electrode can be observed, or controlled, by the difference between the potential of the electrode and that of the reference point, and the electrode can be brought to the chosen position, for instance by moving it until this potential difference is zero.

One means of establishing the reference point is shown in the single figure: a second inductive device 29 is fed from supply 23, and device 29 has a variable tapping point 30 upon it. The potential difference between tap 30 and electrode 22 is applied through transformer 31 to amplifier 32; amplifier 32 can control a reversible servo motor 34 which will drive electrode 22, as indicated by line 35, in a correcting, null-seeking sense until electrode 22 is in the predetermined position.

In operation, tap 30 is set to a position which corresponds to the desired position of the movable electrode 22. If the electrode is not in the desired position, there will occur between tap 30 and electrode 22 a potential which is a function of that difference; this potential difference can be referred to as an error signal. This error signal will by its magnitude and its phase be characteristic both of the extent and direction of the distance of the movable electrode from the desired position.

Where the apparatus is to be used for indicating the positon of a movable element with respect to the setting of the tap 30, an indicator 34 can be used. The apparatus could also be made to indicate the position of the electrode 22 along the line of elements, and then motor 33 is made to vary the position of the tap 30 on the potentiometer 29, instead of element 22, until the error signal falls to zero; the position of tap 30 can be shown on any suitable indicating device.

The response of the apparatus is usually arranged to be linear, but it will be appreciated that the apparatus can be designed to give a non-linear response.

It will be appreciated that guard electrodes may be provided to shield the pick-up electrode 22 from sway capacitances.

It will also be appreciated that the arrangement shown in the drawing is merely illustrative of the invention and many modifications and alterations are possible within the scope of the invention. For instance, the number of elements of the capacitative potentiometer, taps on devices 24 and 29 and secondary windings on transformer 26 can be different, either greater or less, from the numbers shown. Also, it may be convenient in some cases to combine elements such as 24 and 30 in a common inductive device. Again, two or more elements such as 20 can be combined, with the same or different effective scales, to operate from a common element such as 30.

I claim:

1. A position responsive device comprising a source of alternating current, a first inductor connected to said source of alternating current, said first inductor including a plurality of linearly displaced first taps, a plurality of electrical contacts, each of said electrical contacts being connected to a respetcive one of said first taps, a first movable conductive element positionable to contact at least one of said electrical contacts, a second inductor connected to said source, said second inductor including a plurality of linearly displaced second taps, a plurality of fixed conductive elements, a transformer including a primary winding and a plurality of second windings, said primary winding being connected to said source, each of said second windings being connectable respectively between one of said second taps and one of said fixed conductive elements, a second movable conductive element having electrostatic coupling with said fixed conductive elements, a signal difference generating means including first and second input terminals and an output for generating a signal related to the difference in the signals received at said input terminals, means for electrically connecting said first movable conductive element and said second movable conductive element to said input terminals and motor means including a signal input connected to the output of said signal difference generating means and a mechanical output for generating a mechanical movement in accordance with the signal received at said signal input.

2. The position responsive device of claim 1 wherein said motor means drives an indicator whereby the position of one of said movable conductive elements is indicated.

3. The position responsive device of claim 1 further comprising means mechanically connecting the mechanical output of said motor means of said second movable conductive element for driving the latter past said fixed conductive elements.

No references cited.

THOMAS B. HABECKER, *Primary Examiner.*